(12) United States Patent
Yim et al.

(10) Patent No.: US 12,222,070 B2
(45) Date of Patent: Feb. 11, 2025

(54) HYDROGEN TANK SUPPORT APPARATUS (71) Applicant: ILJIN HYSOLUS CO., LTD., Jeollabuk-do (KR)

(72) Inventors: Jun Young Yim, Jeollabuk-do (KR); Seok Jin Lee, Jeollabuk-do (KR); Min Uk Park, Jeollabuk-do (KR); Hui Chun Kim, Jeollabuk-do (KR); Gye Hyoung Yoo, Jeollabuk-do (KR); Jae Woo Park, Jeollabuk-do (KR); Jun Young Kang, Jeollabuk-do (KR)

(73) Assignee: ILJIN HYSOLUS CO., LTD., Jeollabuk-do (KR)

( * ) Notice: Subject to any disclaimer, the term of this patent is extended or adjusted under 35 U.S.C. 154(b) by 0 days.

(21) Appl. No.: 18/032,504

(22) PCT Filed: Oct. 13, 2021

(86) PCT No.: PCT/KR2021/014125
§ 371 (c)(1),
(2) Date: Apr. 18, 2023

(87) PCT Pub. No.: WO2022/086036
PCT Pub. Date: Apr. 28, 2022

(65) Prior Publication Data
US 2023/0408039 A1 Dec. 21, 2023

(30) Foreign Application Priority Data

Oct. 22, 2020 (KR) .................... 10-2020-0137412
Oct. 22, 2020 (KR) .................... 10-2020-0137413

(51) Int. Cl.
*F17C 13/08* (2006.01)
*F17C 13/04* (2006.01)
(52) U.S. Cl.
CPC ............ *F17C 13/084* (2013.01); *F17C 13/04* (2013.01)

(58) Field of Classification Search
CPC ........ F17C 13/084; F17C 13/04; B25B 5/067; B25B 5/101; B25B 1/24; B25B 5/00; F16B 2/065; F16B 2/12; F16M 13/022
USPC ............ 248/229.15, 229.25, 229.14, 229.24, 248/230.5, 230.6, 231.71, 231.61, 316.6
See application file for complete search history.

(56) References Cited

U.S. PATENT DOCUMENTS 4,606,521 A * 8/1986 Williams ............. F16M 13/022
  24/339
7,534,965 B1 * 5/2009 Thompson ............... H02G 3/22
  174/152 G (Continued)

FOREIGN PATENT DOCUMENTS

DE 102015009032 A1 1/2017
KR 10563280 B1 3/2006

(Continued)

OTHER PUBLICATIONS

European Patent Office, Supplementary European Search Report, European Application No. EP21883107, dated Mar. 11, 2024, 8 pages.

*Primary Examiner* — Alfred J Wujciak
(74) *Attorney, Agent, or Firm* — Stinson LLP (57) ABSTRACT

The present disclosure relates to a hydrogen tank support apparatus, and the hydrogen tank support apparatus according to the present disclosure includes: a hydrogen storage tank; a frame portion on which the hydrogen storage tank is seated; and a sliding block portion configured to fix a nozzle portion of the hydrogen storage tank to the frame portion, wherein the sliding block portion includes a lower block portion fixed to the frame portion, an upper block portion coupled to the lower block portion in a concave-convex manner so that movement of the hydrogen storage tank is limited in a longitudinal direction and a width direction of (Continued)

the hydrogen storage tank, and a slide ball portion configured to surround an outer side surface of the nozzle portion, interposed between the lower block portion and the upper block portion, and configured to rotatably support the nozzle portion.

9 Claims, 10 Drawing Sheets

(56) References Cited

U.S. PATENT DOCUMENTS

| | | | |
|---|---|---|---|
| 9,551,326 B2* | 1/2017 | Caspari | H02G 3/32 |
| 9,670,949 B1* | 6/2017 | White | F16B 2/12 |
| 10,012,330 B1* | 7/2018 | Thomas | F16L 3/1075 |
| 2003/0006349 A1 | 1/2003 | Sadowski et al. | |
| 2004/0056164 A1 | 3/2004 | Eihusen et al. | |
| 2004/0075034 A1 | 4/2004 | Yokote | |
| 2019/0093827 A1* | 3/2019 | Yeggy | F17C 13/083 |
| 2023/0213145 A1* | 7/2023 | Woo | B60K 15/07 |
| | | | 220/562 |

FOREIGN PATENT DOCUMENTS

| | | |
|---|---|---|
| KR | 10-1646462 B1 | 8/2016 |
| KR | 10-2018-0027225 A | 3/2018 |
| KR | 20180117968 A | 10/2018 |
| KR | 10-2019-0016917 A | 2/2019 |
| KR | 10-2020-0041674 A | 4/2020 |
| WO | WO03106272 A2 | 12/2003 |
| WO | 2017145058 A2 | 8/2017 |
| WO | 2017222817 A1 | 12/2017 |

* cited by examiner

HYDROGEN TANK SUPPORT APPARATUS

CROSS-REFERENCE TO RELATED APPLICATIONS

This application is a U.S. national stage application of International Application No. PCT/KR2021/014125, filed Oct. 13, 2021, which claims priority to Korean Patent Application No. 10-2020-0137412, filed Oct. 22, 2020, and Korean Patent Application No. 10-2020-0137413, filed Oct. 22, 2020, the entire contents of which are incorporated herein by reference for all purposes.

TECHNICAL FIELD

The present disclosure relates to a hydrogen tank support apparatus, and more particularly, to a hydrogen tank support apparatus which can stably support expansion of a hydrogen storage tank and a change in the axis of the hydrogen storage tank.

BACKGROUND

A hydrogen storage tank is a canister for storing a large volume of hydrogen in a compressed state and supplies hydrogen to a fuel cell electric vehicle (FCEV).

While the energy density per weight of hydrogen is three to four times that of gasoline, the energy density per area of hydrogen is around 25% of that of gasoline. Thus, hydrogen should be stored in a maximally compressed state in a hydrogen storage tank for an efficient use of the hydrogen storage tank.

A mounting block for supporting a hydrogen storage tank according to the related art has problems that the assembly time is increased due to a large number of components, and productivity is low such that the price competitiveness is low. Also, there is a problem that the size of a snap ring configured to support a nozzle should be increased with an increase in the size of the hydrogen storage tank and an increase in the diameter of the nozzle. Accordingly, there is a need to address such problems.

The related art of the present disclosure has been disclosed in Korean Unexamined Patent Application Publication No. 10-2019-0016917 (Date of Publication: Feb. 19, 2019, Title of Disclosure: High-pressure canister unit and fuel cell vehicle).

SUMMARY

The present disclosure provides a hydrogen tank support apparatus which can stably support expansion of a hydrogen storage tank and a change in the axis of the hydrogen storage tank.

The present disclosure provides a hydrogen tank support apparatus including: a hydrogen storage tank; a frame portion on which the hydrogen storage tank is seated; and a sliding block portion configured to fix a nozzle portion of the hydrogen storage tank to the frame portion, wherein the sliding block portion includes a lower block portion fixed to the frame portion, an upper block portion coupled to the lower block portion in a concave-convex manner so that movement of the hydrogen storage tank is limited in a longitudinal direction and a width direction of the hydrogen storage tank, and a slide ball portion configured to surround an outer side surface of the nozzle portion, interposed between the lower block portion and the upper block portion, and configured to rotatably support the nozzle portion.

In the present disclosure, the lower block portion may include: a lower block base portion fixed to the frame portion; a lower block body portion formed to extend from the lower block base portion toward the upper block portion and configured to accommodate the slide ball portion; and a convex portion formed to be convex from the lower block body portion toward the upper block portion and coupled to the upper block portion in a concave-convex manner.

In the present disclosure, the convex portion may be formed to protrude from an outermost side of the lower block body portion in the longitudinal direction of the hydrogen storage tank.

In the present disclosure, the upper block portion may include: an upper block body portion seated on the lower block body portion and configured to accommodate the slide ball portion; and a concave portion formed to be concave in the upper block body portion to face the convex portion and coupled to the convex portion in a concave-convex manner.

In the present disclosure, the concave portion may include: a concave groove portion configured to accommodate the convex portion; and a catching step portion formed to protrude from the concave groove portion to surround an outer side surface of the convex portion.

In the present disclosure, the catching step portion may be formed on the concave groove portion to surround the outer side surface of the convex portion in the longitudinal direction of the hydrogen storage tank.

In the present disclosure, the catching step portion may be formed on the concave groove portion to surround three sides of the outer side surface of the convex portion.

In the present disclosure, the sliding block portion may further include: a first fastening portion configured to fasten the lower block portion and the upper block portion to each other; and a second fastening portion configured to fasten the lower block portion and the frame portion to each other.

In the present disclosure, the hydrogen tank support apparatus may further include a fixing block portion configured to fix the hydrogen storage tank to the frame portion.

By a hydrogen tank support apparatus according to the present disclosure, a nozzle portion of a hydrogen storage tank can be stably supported while the number of components for stably supporting the nozzle portion of the hydrogen storage tank is reduced, and assembly time can be reduced, thus improving productivity.

Also, according to the present disclosure, the nozzle portion of the hydrogen storage tank can be prevented from being detached.

DETAILED DESCRIPTION

Hereinafter, one embodiment of a hydrogen tank support apparatus according to the present disclosure will be described with reference to the accompanying drawings. In such a process, thicknesses of lines, sizes of elements, or the like illustrated in the drawings may be exaggerated for clarity and convenience of description.

Also, terms used below are terms defined in consideration of functions in the present disclosure and may be changed according to the intention or practice of a user or operator. Therefore, such terms should be defined on the basis of the content throughout the specification.

Figure 1:
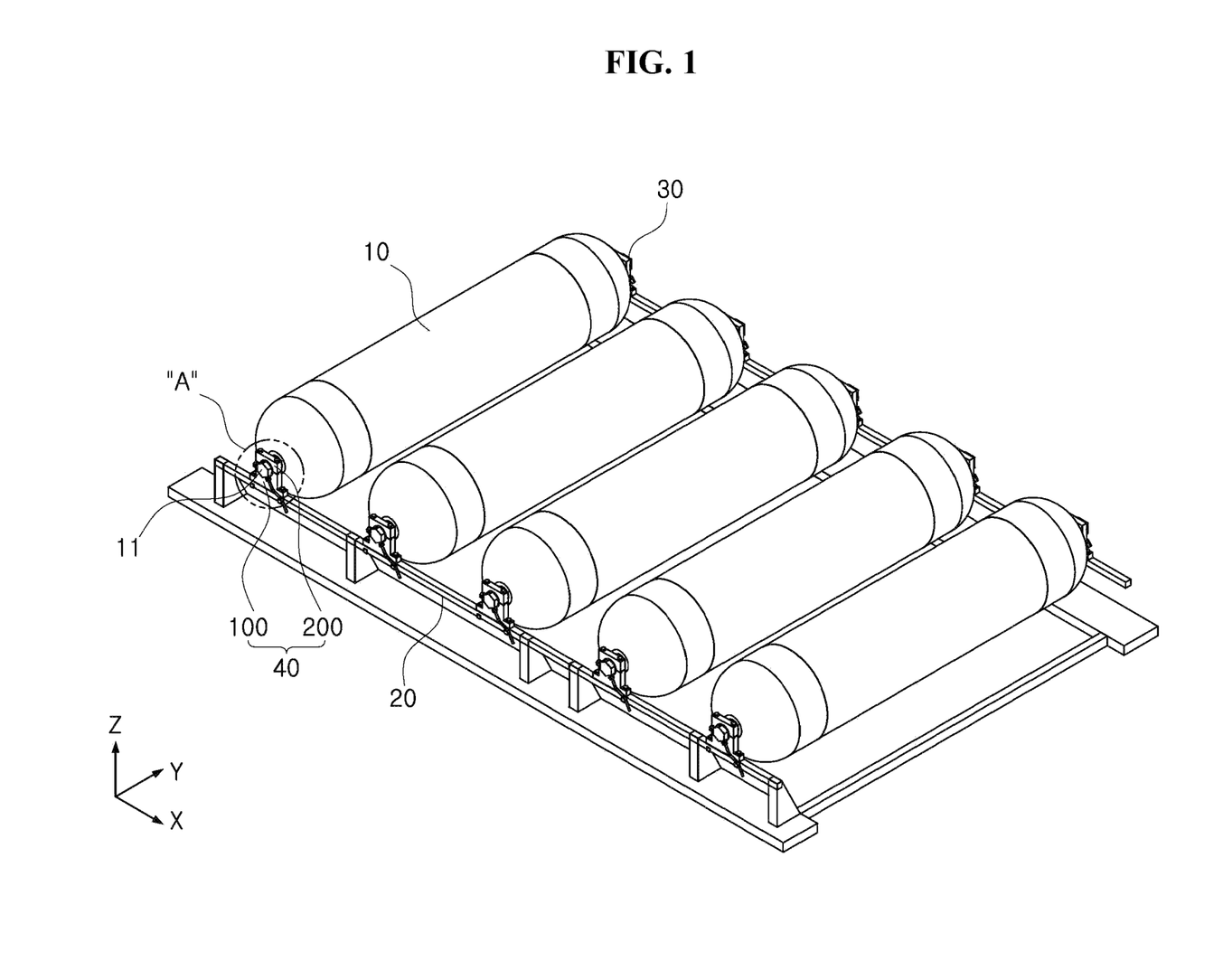
FIG. 1 is a perspective view from one side schematically illustrating a hydrogen tank support apparatus according to one embodiment of the present disclosure.
Figure 2:
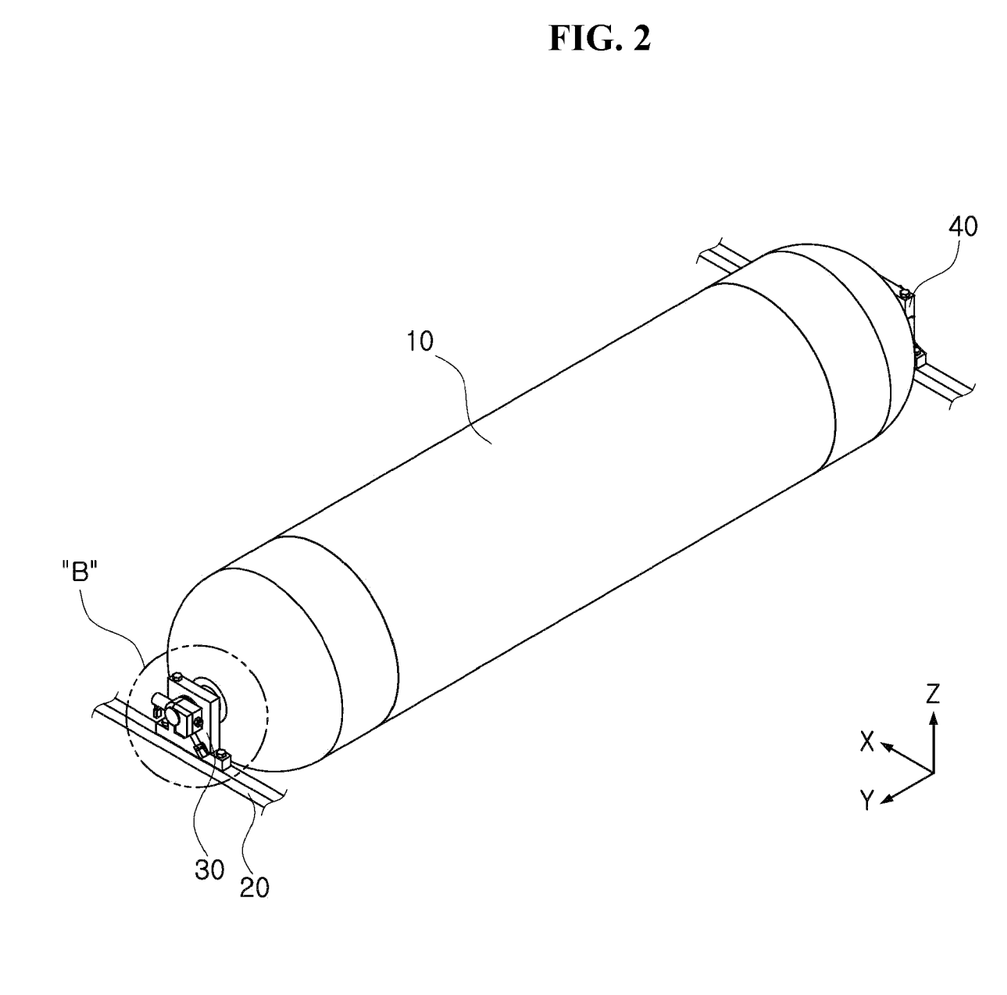
FIG. 2 is a perspective view from another side schematically illustrating the hydrogen tank support apparatus according to one embodiment of the present disclosure.
Figure 3:
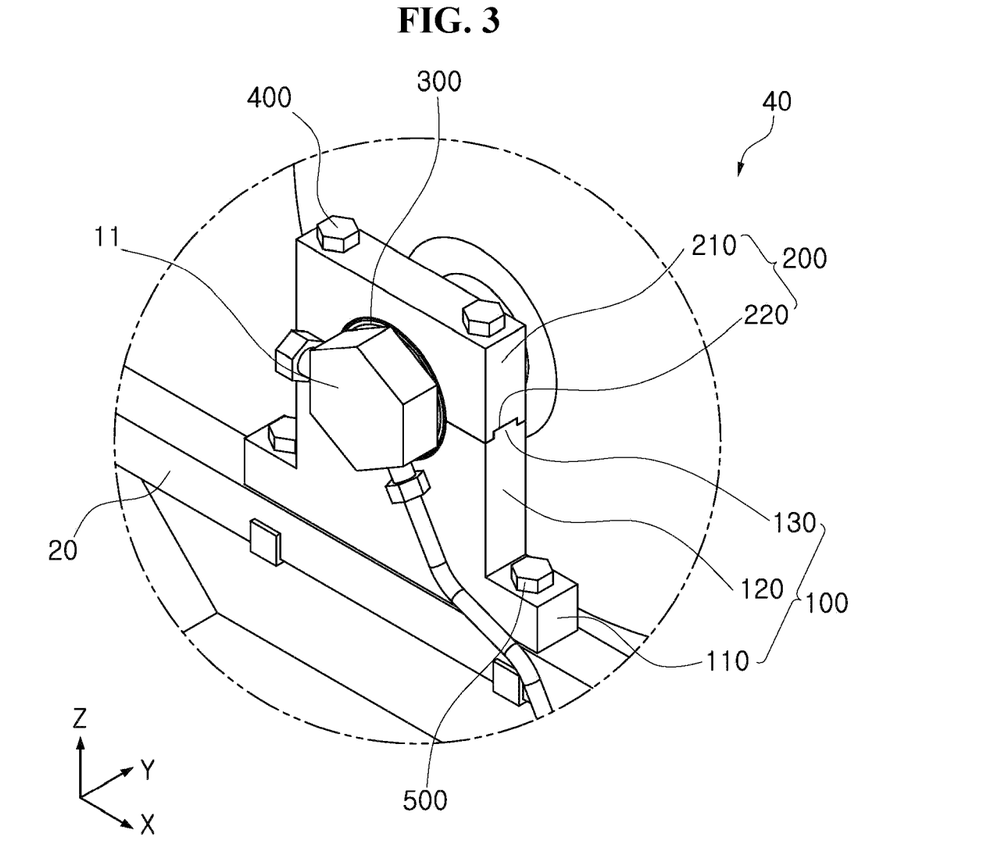
FIG. 3 is a schematic enlarged view of portion "A" of FIG. 1.
Figure 4:
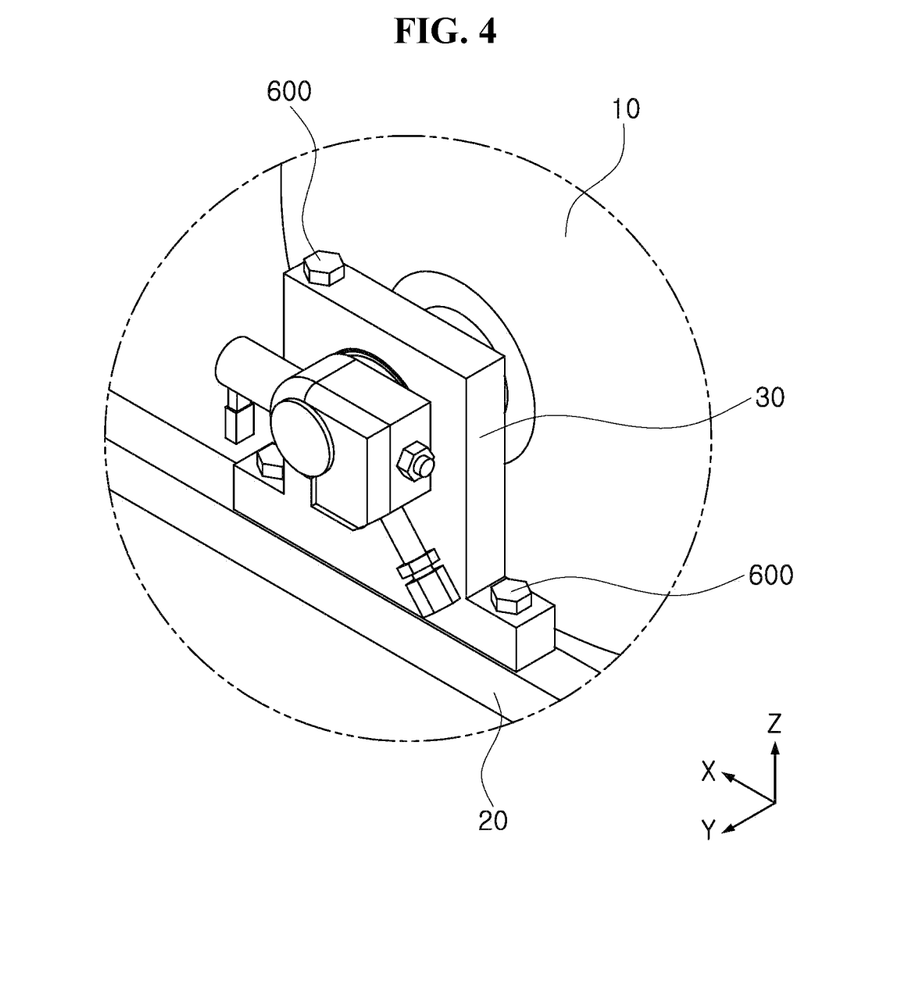
FIG. 4 is a schematic enlarged view of portion "B" of FIG. 2.
Figure 5:
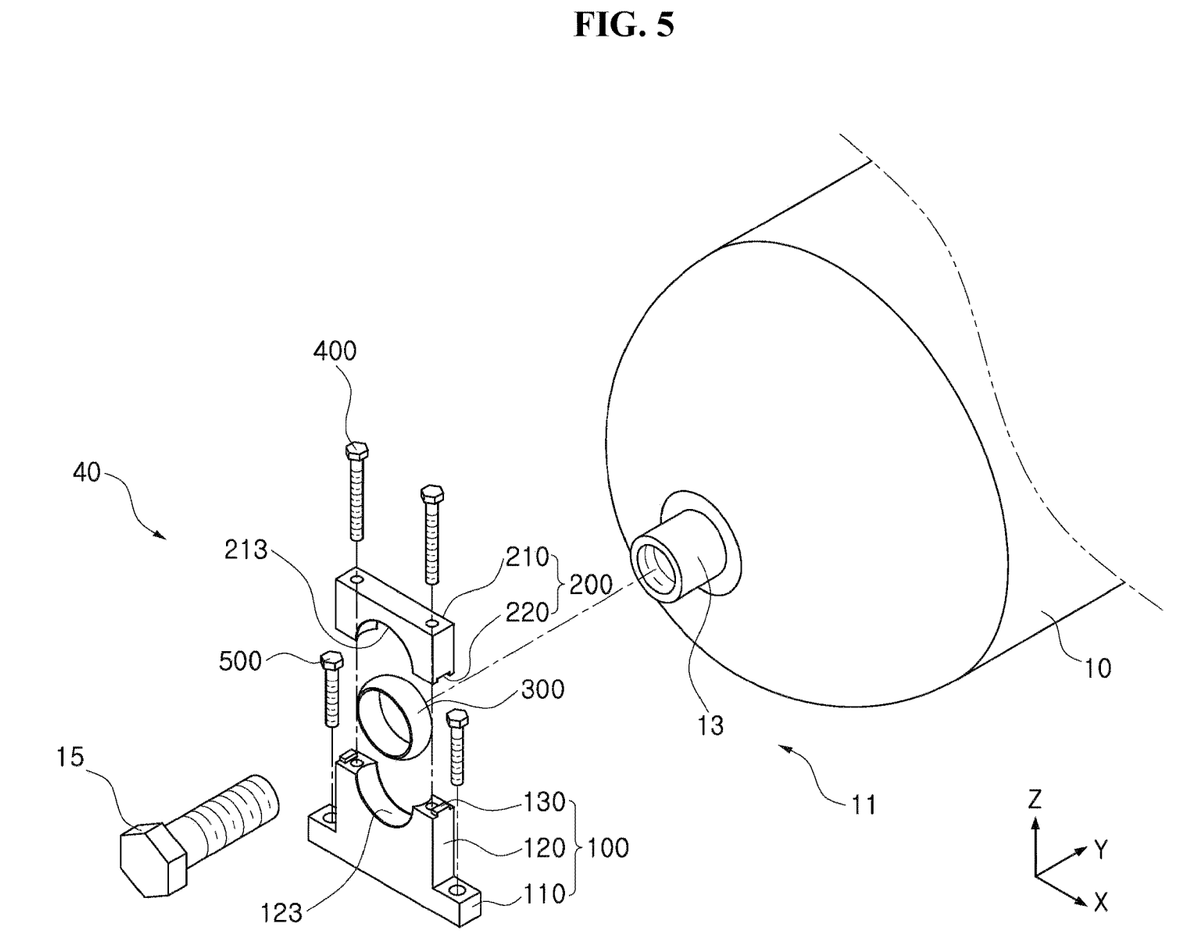
FIG. 5 is an exploded perspective view schematically illustrating the hydrogen tank support apparatus according to one embodiment of the present disclosure.
Figure 6:
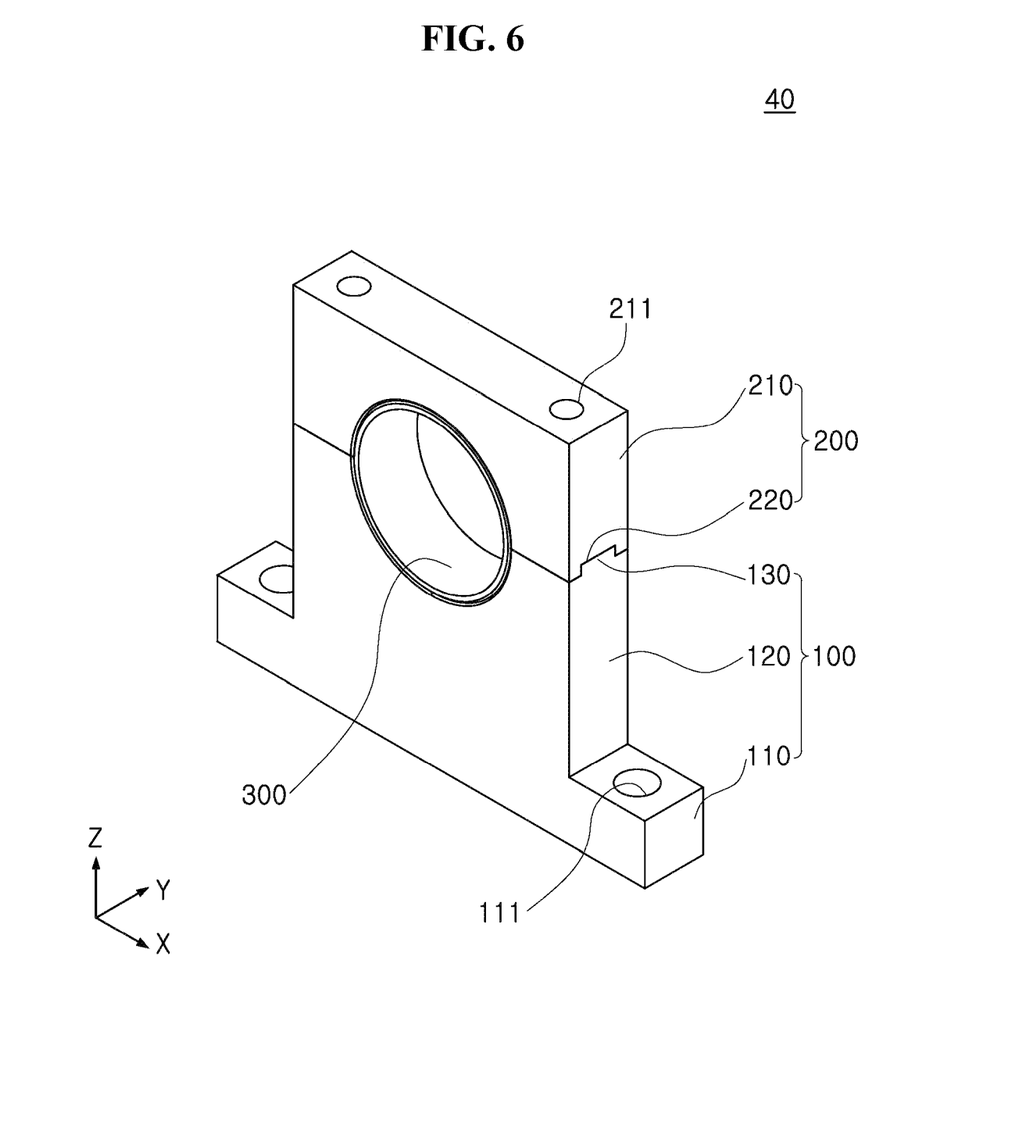
FIG. 6 is a perspective view schematically illustrating a sliding block portion according to one embodiment of the present disclosure.
Figure 7:
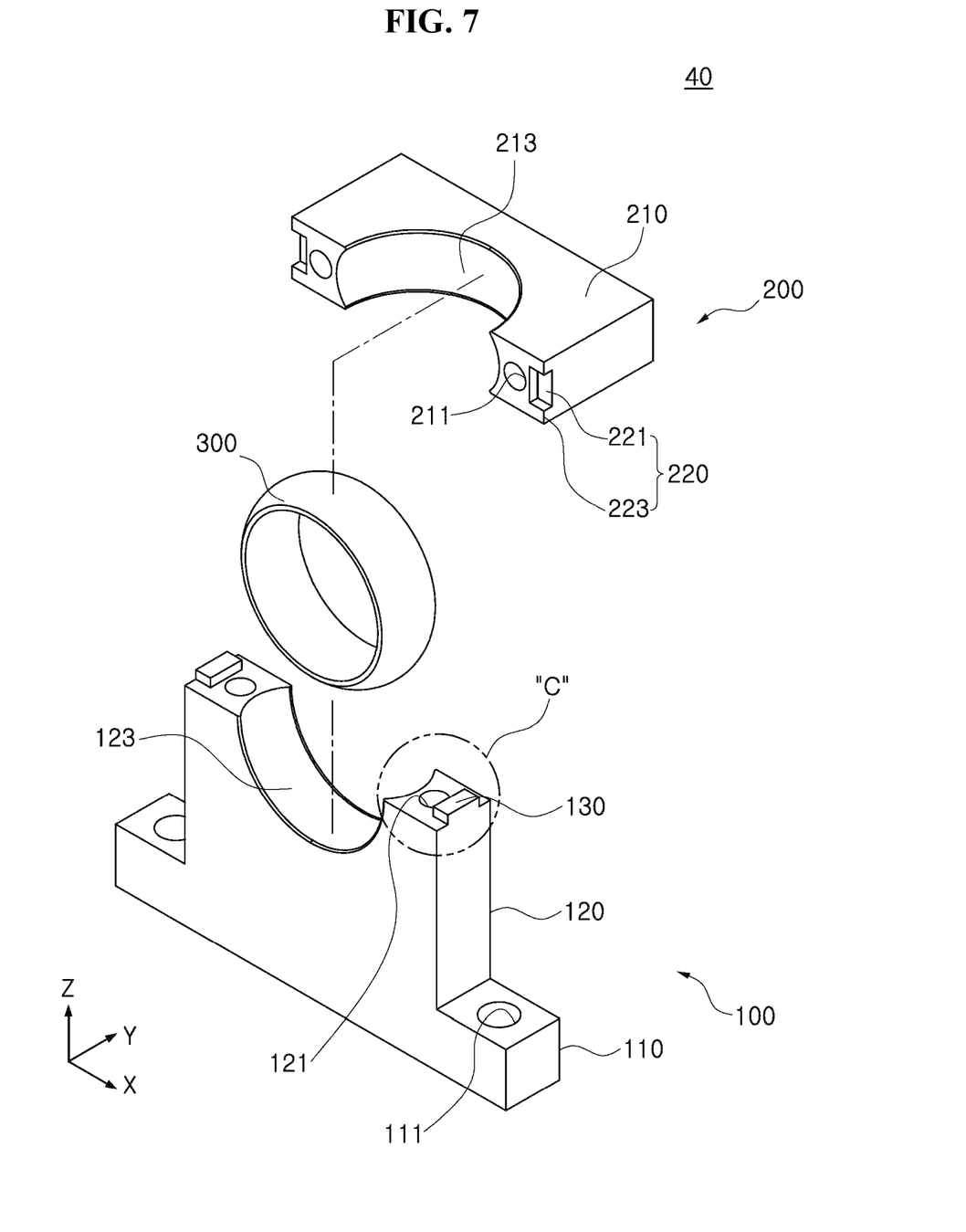
FIG. 7 is an exploded perspective view schematically illustrating the sliding block portion according to one embodiment of the present disclosure.
Figure 8:
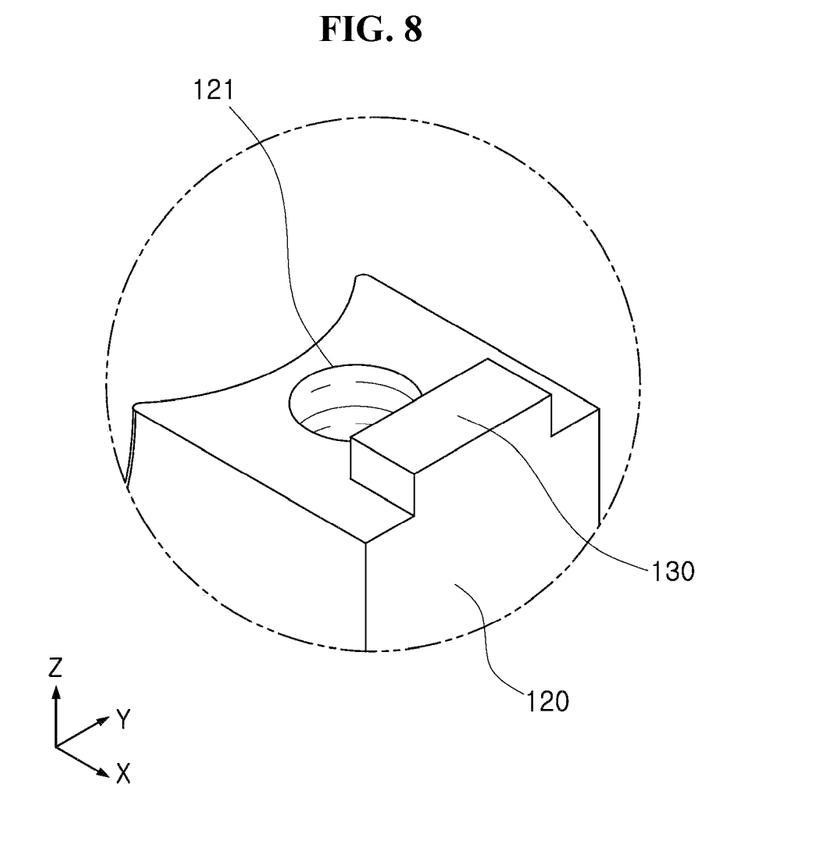
FIG. 8 is a schematic enlarged view of portion "C" of FIG. 7.
Figure 9:
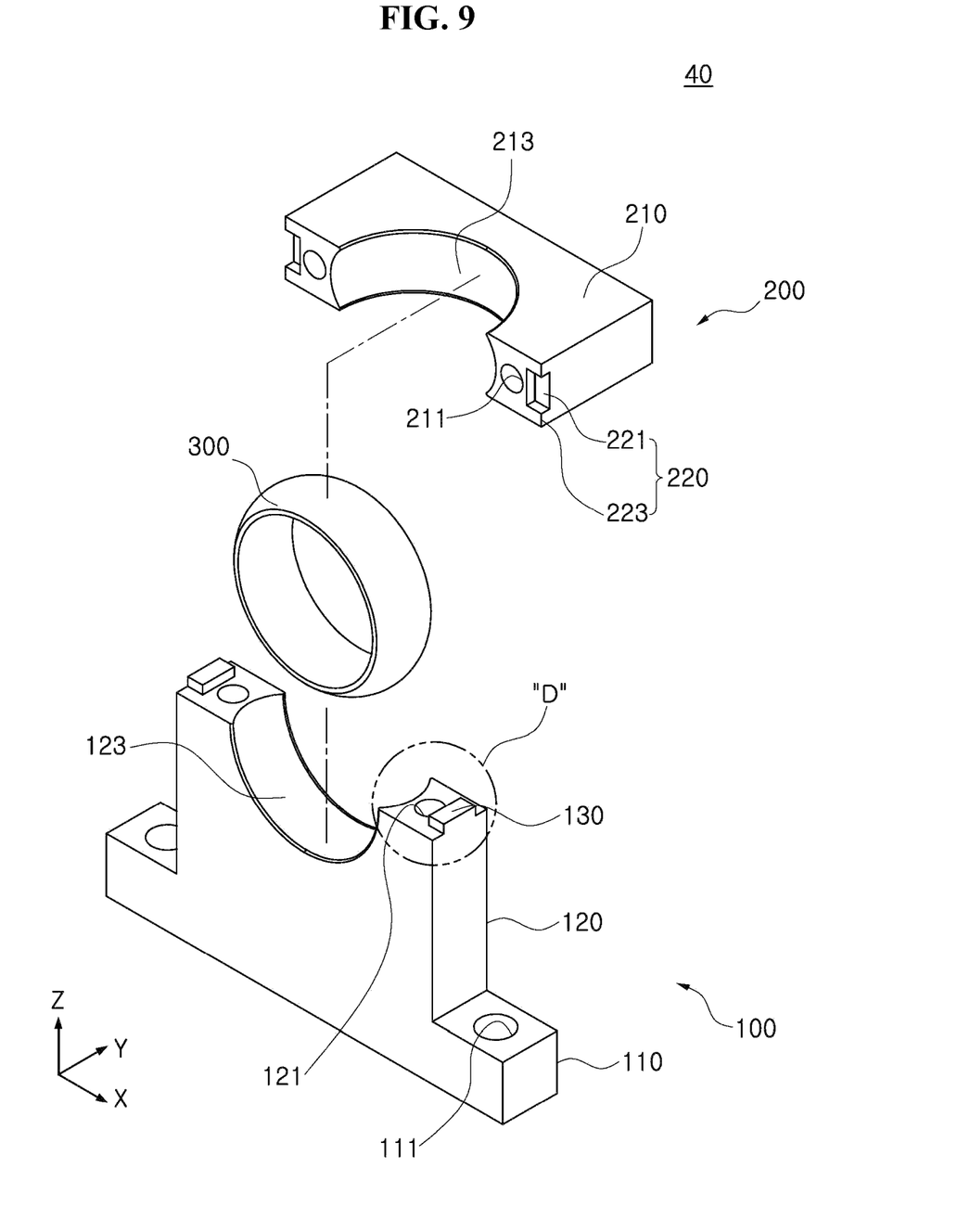
FIG. 9 is an exploded perspective view schematically illustrating a sliding block portion according to another embodiment of the present disclosure.
Figure 10:
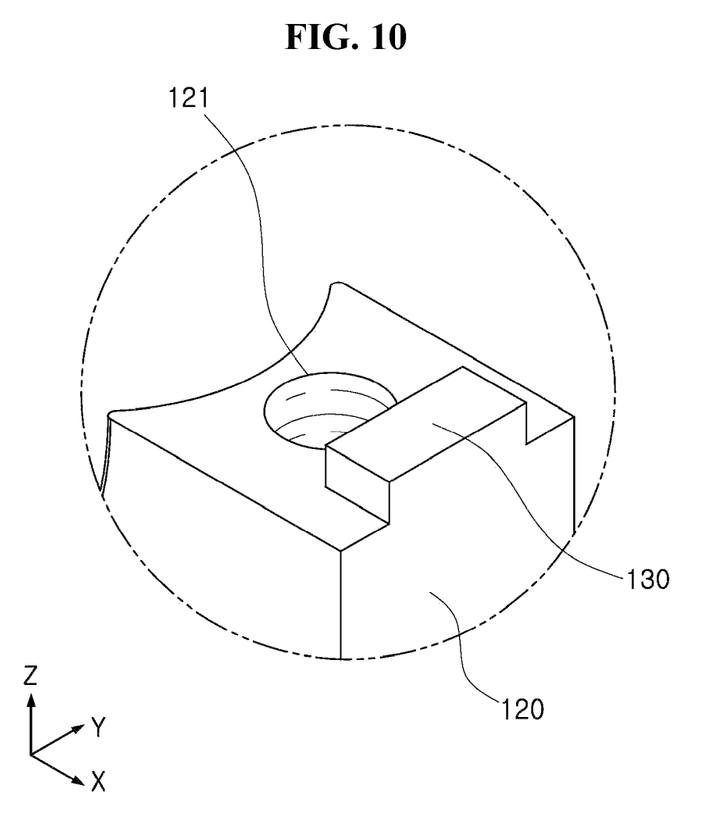
FIG. 10 is a schematic enlarged view of portion "D" of FIG. 9.

FIG. 1 is a perspective view from one side schematically illustrating a hydrogen tank support apparatus according to one embodiment of the present disclosure, FIG. 2 is a perspective view from another side schematically illustrating the hydrogen tank support apparatus according to one embodiment of the present disclosure, FIG. 3 is a schematic enlarged view of portion "A" of FIG. 1, FIG. 4 is a schematic enlarged view of portion "B" of FIG. 2, FIG. 5 is an exploded perspective view schematically illustrating the hydrogen tank support apparatus according to one embodiment of the present disclosure, FIG. 6 is a perspective view schematically illustrating a sliding block portion according to one embodiment of the present disclosure, FIG. 7 is an exploded perspective view schematically illustrating the sliding block portion according to one embodiment of the present disclosure, FIG. 8 is a schematic enlarged view of portion "C" of FIG. 7, FIG. 9 is an exploded perspective view schematically illustrating a sliding block portion according to another embodiment of the present disclosure, and FIG. 10 is a schematic enlarged view of portion "D" of FIG. 9.

Referring to FIGS. 1 to 8, the hydrogen tank support apparatus according to one embodiment of the present disclosure includes a hydrogen storage tank 10, a frame portion 20, a fixing block portion 30, and a sliding block portion 40.

The hydrogen storage tank 10 is a canister for storing hydrogen in a compressed state in an inner space thereof. The hydrogen storage tank 10 allows a fuel cell electric vehicle to be charged with hydrogen and produce electricity necessary to run the vehicle. The hydrogen storage tank 10 is formed in a cylindrical shape having both ends formed in an elliptical shape to prevent damage due to pressure of hydrogen.

The frame portion 20 supports the hydrogen storage tank 10 to prevent the hydrogen storage tank 10 from being detached from the fuel cell electric vehicle. The hydrogen storage tank 10 is seated on one side surface (an upper side surface based on FIG. 1) of the frame portion 20.

The fixing block portion 30 fixes the hydrogen storage tank 10 to the frame portion 20. The fixing block portion 30 fixes the hydrogen storage tank 10 to the frame portion 20 to prevent the hydrogen storage tank 10 from being detached from the frame portion 20 due to an external impact or the like.

The fixing block portion 30 is fixed to the frame portion 20 by a third fastening portion 600, and the opening or closing of the fixing block portion 30 is adjusted using the third fastening portion 600. Here, the third fastening portion 600 is formed of a bolt, a screw, or the like having screw threads formed on an outer side surface thereof. Like the third fastening portion 600, each of a first fastening portion 400 and a second fastening portion 500, which will be described below, is also formed of a bolt, a screw, or the like having screw threads formed on an outer side surface thereof.

The sliding block portion 40 fixes a nozzle portion 11 of the hydrogen storage tank 10 to the frame portion 20. When an axis of the nozzle portion 11 or the hydrogen storage tank 10 is misaligned with the frame portion 20 due to expansion or the like of the hydrogen storage tank 10 that occurs due to pressure of gas accommodated in the hydrogen storage tank 10, the sliding block portion 40 may absorb a change amount thereof to stably support the hydrogen storage tank 10.

The nozzle portion 11 allows hydrogen to be sprayed from the hydrogen storage tank 10 and includes a nozzle 13 and an opening/closing portion 15. Hydrogen is sprayed from the hydrogen storage tank 10 through the nozzle 13. Screw threads are formed on an inner side surface of the nozzle 13 to allow the opening/closing portion 15 to be detachable. The opening/closing portion 15 is screw-fastened to the inner side surface of the nozzle 13 and has screw threads formed on an outer side surface thereof.

The sliding block portion 40 includes a lower block portion 100, an upper block portion 200, a slide ball portion 300, the first fastening portion 400, and the second fastening portion 500.

The lower block portion 100 is fixed to the frame portion 20. The lower block portion 100 is fixed to the frame portion 20 by the second fastening portion 500 or by being welded to the frame portion 20. The lower block portion 100 includes a lower block base portion 110, a lower block body portion 120, and a convex portion 130.

The lower block base portion 110 is seated on one side surface (an upper side surface based on FIG. 3) of the frame portion 20 and fixed to the frame portion 20. The lower block base portion 110 is fixed to the frame portion 20 by the second fastening portion 500 or by being welded to the frame portion 20. The lower block base portion 110 is disposed orthogonal to the longitudinal direction of the hydrogen storage tank 10.

A first lower through-hole portion 111, through which the second fastening portion 500 passes, is formed to pass through both ends of the lower block base portion 110. Screw threads may not be formed in an inner side surface of the first lower through-hole portion 111 to allow the second fastening portion 500 to pass therethrough, or screw threads configured to be screw-fastened to the second fastening portion 500 may be formed in the inner side surface of the first lower through-hole portion 111. The second fastening portion 500 passes through the first lower through-hole portion 111 or is screw-fastened to the first lower through-hole portion 111 to be screw-fastened to the frame portion 20. Accordingly, the lower block base portion 110 of the lower block portion 100 and the frame portion 20 may be integrally fixed by the second fastening portion 500.

The lower block body portion 120 is formed to extend from the lower block base portion 110 toward the upper block portion 200 and accommodates the slide ball portion 300. To allow the second fastening portion 500 to be screw-fastened, the lower block body portion 120 is formed to extend in a stepped manner from the lower block base portion 110.

A lower accommodating groove portion 123 formed in a hemispherical shape is formed in one side surface (an upper side surface based on FIG. 7) of the lower block body portion 120 to accommodate the slide ball portion 300. To allow the slide ball portion 300, which is configured to support the nozzle 13 of the nozzle portion 11, to be rotatable about three axes (the X-axis, Y-axis, and Z-axis based on FIG. 6), the lower accommodating groove portion 123 is formed as a three-dimensional concave curved surface that corresponds to an outer side surface of the slide ball portion 300.

Referring to FIGS. 7 and 8, in one embodiment of the present disclosure, the convex portion 130 is formed to be convex from the lower block body portion 120 toward a concave portion 220 of the upper block portion 200 and is coupled to the concave portion 220 of the upper block portion 200 in a concave-convex manner. Since the convex portion 130 is coupled to the concave portion 220 of the upper block portion 200 in a concave-convex manner, the coupling time can be reduced, and productivity can be improved.

The convex portion 130 is formed to protrude from the lower block base portion 110 in a longitudinal direction of the lower block base portion 110 (the X-axis direction based on FIG. 7). A second lower through-hole portion 121 configured to communicate with an upper through-hole portion 211 of the upper block portion 200 is formed in the convex portion 130 and the lower block body portion 120. Screw threads configured to be screw-fastened to the first fastening portion 400 may be formed on an inner side surface of the second lower through-hole portion 121. By passing through the upper through-hole portion 211 or being screw-fastened thereto, the first fastening portion 400 may be screw-fastened to the second lower through-hole portion 121 and integrally fix the upper block portion 200 and the lower block portion 100.

The upper block portion 200 is coupled to the lower block portion 100 in a concave-convex manner so that movement of the hydrogen storage tank 10 is limited in the longitudinal direction thereof (the Y-axis direction based on FIG. 1). The upper block portion 200 includes an upper block body portion 210 and the concave portion 220.

Referring to FIGS. 9 and 10, in another embodiment of the present disclosure, the convex portion 130 is formed to protrude from an outermost side of the lower block body portion 120 in the longitudinal direction of the hydrogen storage tank 10. The convex portion 130 is formed to protrude to be disposed at the outermost side of an upper side of the lower block body portion 120.

The upper block portion 200 is coupled to the lower block portion 100 in a concave-convex manner so that movement of the hydrogen storage tank 10 is limited in the longitudinal direction thereof (the Y-axis direction based on FIG. 1) and a width direction thereof (the X-axis direction based on FIG. 1). The upper block portion 200 includes the upper block body portion 210 and the concave portion 220.

The upper block body portion 210 is seated on the lower block body portion 120 and accommodates the slide ball portion 300. The upper through-hole portion 211 communicating with the second lower through-hole portion 121 of the lower block portion 100 is formed in the upper block body portion 210. The first fastening portion 400 may pass through an inner side surface of the upper through-hole portion 211, or screw threads configured to be screw-fastened to the first fastening portion 400 may be formed on the inner side surface of the upper through-hole portion 211. By passing through the upper through-hole portion 211 or being screw-fastened thereto, the first fastening portion 400 may be screw-fastened to the second lower through-hole portion 121 and integrally fix the upper block portion 200 and the lower block portion 100.

An upper accommodating groove portion 213 formed in a hemispherical shape is formed in one side surface (a left side surface based on FIG. 7) of the upper block body portion 210 to accommodate the slide ball portion 300. To allow the slide ball portion 300, which is configured to support the nozzle 13 of the nozzle portion 11, to be rotatable about the three axes (the X-axis, Y-axis, and Z-axis based on FIG. 6), the upper accommodating groove portion 213 is formed as a three-dimensional concave curved surface that corresponds to the outer side surface of the slide ball portion 300.

The concave portion 220 is formed to be concave in the upper block body portion 210 to face the convex portion 130 and is coupled to the convex portion 130 in a concave-convex manner. The concave portion 220 includes a concave groove portion 221 and a catching step portion 223.

Referring to FIGS. 7 and 8, in one embodiment of the present disclosure, the concave groove portion 221 is for accommodating the convex portion 130 and is formed to be concave to correspond to the shape of the convex portion 130. The catching step portion 223 is formed to protrude from the concave groove portion 221 and surrounds an outer side surface of the convex portion 130. The catching step portion 223 is formed on the concave groove portion 221 to surround the outer side surface of the convex portion 130 in the longitudinal direction of the hydrogen storage tank 10 (the Y-axis direction based on FIG. 5). That is, the catching step portion 223 is formed to surround the convex portion 130 in the Y-axis direction based on FIG. 7 so that movement of the hydrogen storage tank 10 in the longitudinal direction thereof is limited.

Referring to FIGS. 9 and 10, in another embodiment of the present disclosure, the concave groove portion 221 is for accommodating the convex portion 130 and is formed to be concave to correspond to the shape of the convex portion 130. The catching step portion 223 is formed to protrude from the concave groove portion 221 and surrounds three sides of the outer side surface of the convex portion 130. That is, the catching step portion 223 is formed to surround two sides of the convex portion 130 in the Y-axis direction based on FIG. 7 and surround one side of the convex portion 130 disposed at an inner side of the lower block body portion 120 so that movement of the hydrogen storage tank 10 in the longitudinal direction and width direction thereof is limited.

The slide ball portion 300 is formed in a hollow ring shape and has an outer side surface formed as a three-dimensional curved surface. The slide ball portion 300 surrounds an outer side surface of the nozzle 13 of the nozzle portion 11, is interposed between the lower block portion 100 and the upper block portion 200, and rotatably supports the nozzle 13 of the nozzle portion 11.

The slide ball portion 300 may be interposed to be capable of three-dimensional rotation between the lower accommodating groove portion 123 of the lower block portion 100 and the upper accommodating groove portion 213 of the upper block portion 200 and may three-dimensionally rotate in relation to the nozzle 13 of the nozzle portion 11, expansion of the hydrogen storage tank 10, or the like.

The first fastening portion 400 fastens the lower block portion 100 and the upper block portion 200 to each other, and the second fastening portion 500 fastens the lower block portion 100 and the frame portion 20 to each other.

By passing through the upper through-hole portion 211 or being screw-fastened thereto, the first fastening portion 400 may be screw-fastened to the second lower through-hole portion 121 and integrally fix the upper block portion 200 and the lower block portion 100.

By passing through the first lower through-hole portion 111 or being screw-fastened to the first lower through-hole portion 111, the second fastening portion 500 is screw-fastened to the frame portion 20. Accordingly, the lower block base portion 110 of the lower block portion 100 and the frame portion 20 may be integrally fixed by the second fastening portion 500.

By a hydrogen tank support apparatus according to the present disclosure, a nozzle portion of a hydrogen storage tank can be stably supported while the number of components for stably supporting the nozzle portion of the hydrogen storage tank is reduced, and assembly time can be reduced, thus improving productivity.

Also, according to the present disclosure, the nozzle portion of the hydrogen storage tank can be prevented from being detached.

The present disclosure has been described above with reference to the embodiments illustrated in the drawings, but the embodiments are only illustrative, and those of ordinary skill in the art should understand that various modifications and other equivalent embodiments are possible from the embodiments described above. Therefore, the true technical scope of the present disclosure should be defined by the claims below.

The invention claimed is:

1. A hydrogen tank support apparatus comprising:
   a hydrogen storage tank;
   a frame portion on which the hydrogen storage tank is seated; and
   a sliding block portion configured to fix a nozzle portion of the hydrogen storage tank to the frame portion,
   wherein the sliding block portion includes a lower block portion fixed to the frame portion, an upper block portion coupled to the lower block portion in a concave-convex manner so that movement of the hydrogen storage tank is limited in a longitudinal direction and a width direction of the hydrogen storage tank, and a slide ball portion configured to surround an outer side surface of the nozzle portion, mounted inside of a concave of the lower block portion and the upper block portion, and configured to rotatably support the nozzle portion.

2. The hydrogen tank support apparatus of claim 1, wherein the lower block portion includes:
   a lower block base portion fixed to the frame portion;
   a lower block body portion formed to extend from the lower block base portion toward the upper block portion and configured to accommodate the slide ball portion; and
   a convex portion formed to be convex from the lower block body portion toward the upper block portion and coupled to the upper block portion in a concave-convex manner.

3. The hydrogen tank support apparatus of claim 2, wherein the convex portion is formed to protrude from an outermost side of the lower block body portion in the longitudinal direction of the hydrogen storage tank.

4. The hydrogen tank support apparatus of claim 3, wherein the upper block portion includes:
   an upper block body portion seated on the lower block body portion and configured to accommodate the slide ball portion; and
   a concave portion formed to be concave in the upper block body portion to face the convex portion and coupled to the convex portion in a concave-convex manner.

5. The hydrogen tank support apparatus of claim 4, wherein the concave portion includes:
   a concave groove portion configured to accommodate the convex portion; and
   a catching step portion formed to protrude from the concave groove portion to surround an outer side surface of the convex portion.

6. The hydrogen tank support apparatus of claim 5, wherein the catching step portion is formed on the concave groove portion to surround the outer side surface of the convex portion in the longitudinal direction of the hydrogen storage tank.

7. The hydrogen tank support apparatus of claim 5, wherein the catching step portion is formed on the concave groove portion to surround three sides of the outer side surface of the convex portion.

8. The hydrogen tank support apparatus of claim 1, wherein the sliding block portion further includes:
   a first fastening portion configured to fasten the lower block portion and the upper block portion to each other; and
   a second fastening portion configured to fasten the lower block portion and the frame portion to each other.

9. The hydrogen tank support apparatus of claim 1, further comprising a fixing block portion configured to fix the hydrogen storage tank to the frame portion.

* * * * *